Nov. 21, 1939.  J. E. WHITFIELD  2,180,379
MATERIAL MOVING APPARATUS
Filed June 30, 1937
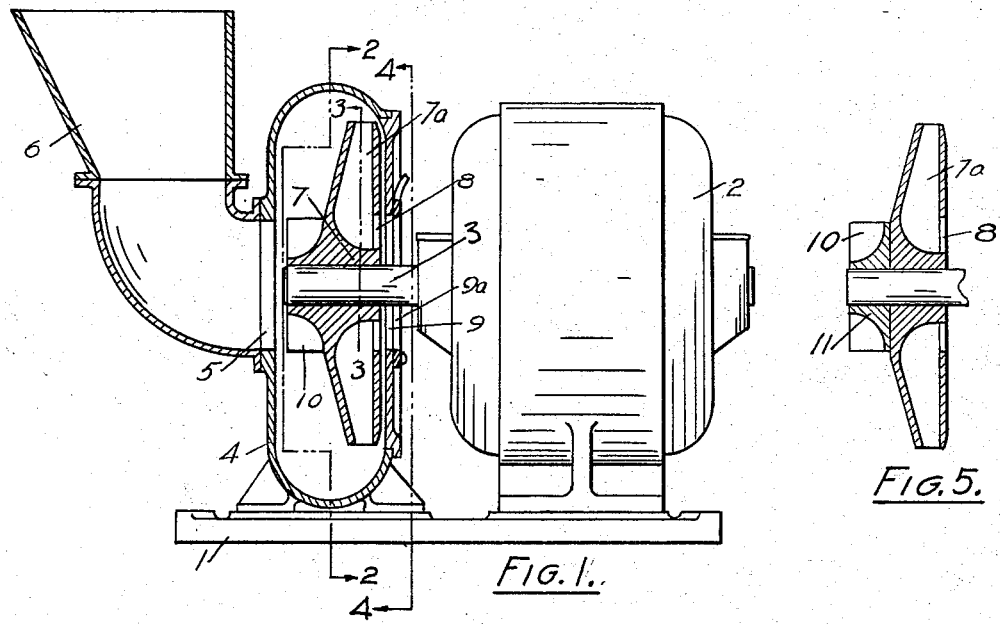
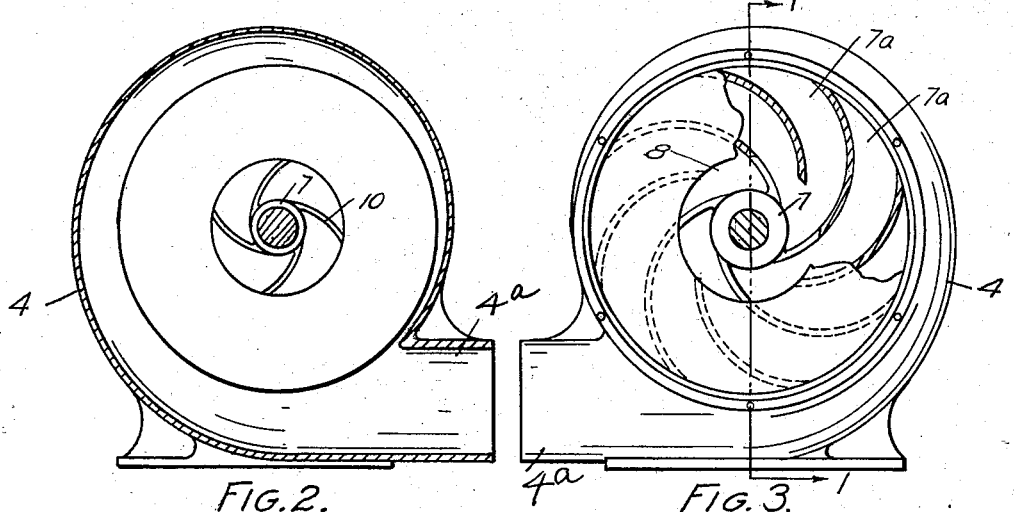
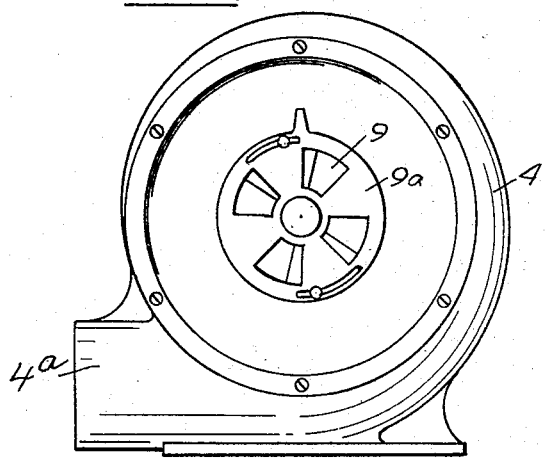
Joseph E. Whitfield
INVENTOR.
BY
ATTORNEYS.

Joseph E. Whitfield
INVENTOR.

BY
ATTORNEYS.

Patented Nov. 21, 1939

2,180,379

UNITED STATES PATENT OFFICE 2,180,379

MATERIAL MOVING APPARATUS

Joseph E. Whitfield, Grove City, Pa.

Application June 30, 1937, Serial No. 151,157

5 Claims. (Cl. 302—35)

This invention is designed to improve apparatus for moving material, particularly such material as has destructive abrasive effect upon the moving apparatus.

In carrying out the invention, particularly as exemplified, a blower receives its air from one side of the case, and material is delivered to the opposite side of the case, and is entrained with the air as it is discharged from the blower so that the air propelling members of the blower are not brought into destructive abrasive relation to the material. Preferably the material is operated upon by an actuator rotated with the air propelling means so that the material is not only mixed but thrown to the periphery of the case so as to be more readily taken up and entrained by the air discharged from the blower. In case the material from the blower should be obstructed in its passage or becomes clogged, it is desirable to increase the air force so as to continue the movement of the material. This is accomplished automatically by control of the driving means responsive to the discharge pressure which reflects the effect of the obstruction or clogging. Features and details of the invention will appear from the specification and claims.

A preferred embodiment of the invention is illustrated in the accompanying drawings as follows:

Fig. 1 shows a front elevation of the apparatus partly in vertical section on the line 1—1 in Fig. 3.

Fig. 2 a section on the line 2—2 in Fig. 1.

Fig. 3 a side elevation of the blower from the right of Fig. 1, a part being in section on the line 3—3 in Fig. 1.

Fig. 4 is a section on the line 4—4 in Fig. 1.

Fig. 5 shows a modification of the rotor members.

Figure 6:
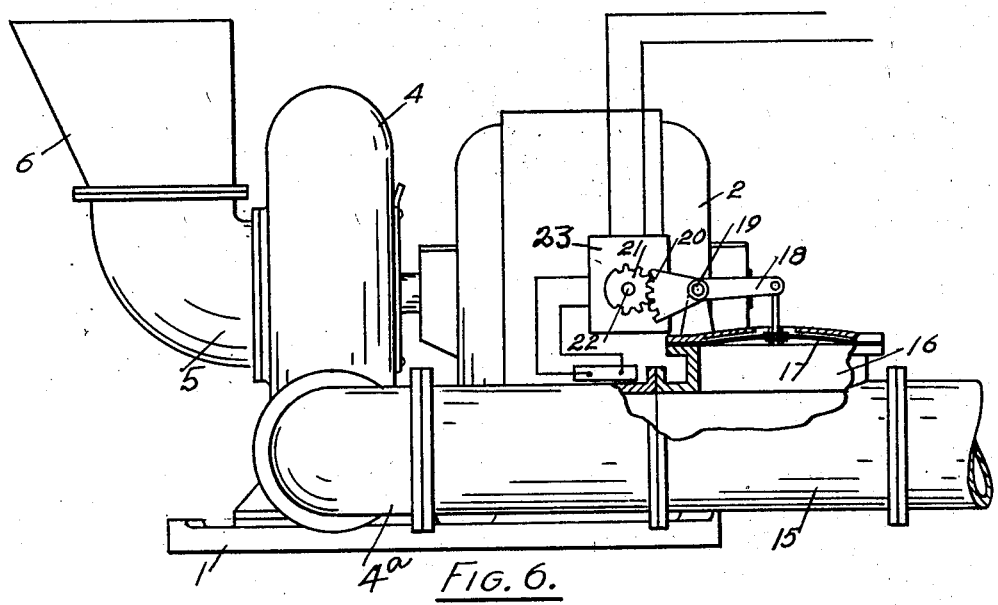
Fig. 6 shows a front elevation of the apparatus as a whole, a part being broken away to show a control mechanism.
Figure 7:
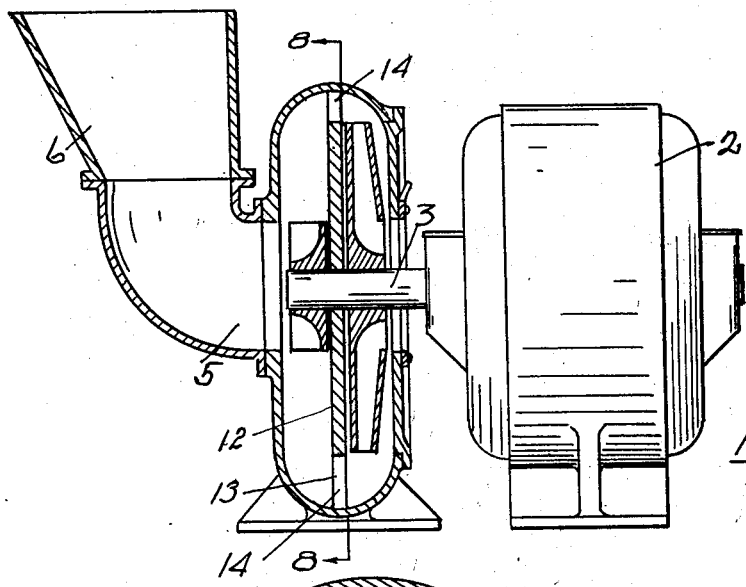

Fig. 7 a front elevation, partly in section, showing a modification of the blower and material moving structure.

Figure 8:
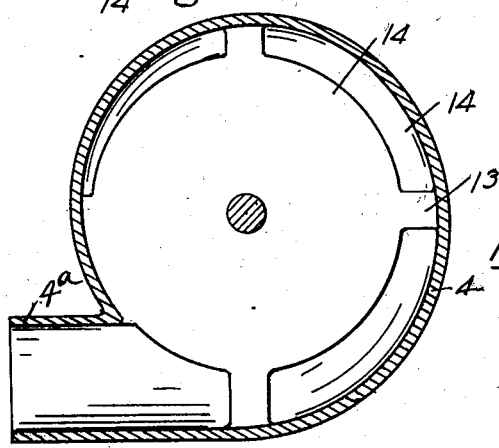

Fig. 8 a section on the line 8—8 in Fig. 7.

1 marks a base of the machine, 2 a motor which, as shown, is an electric motor, 3 a shaft driven from the rotor of the motor, 4 a case for the fan or air propeller, 4a a discharge outlet, and 5 an inlet passage to the case, this inlet passage leading from a hopper 6 to which the material is delivered. The blower is provided with a hub 7 and enclosed vanes providing blower passages 7a of the common type having an inlet opening 8 in the wall to the passages at the center. An air inlet opening 9 extends through the case and registers with the opening 8. The slotted opening 9 is controlled by a rotating slotted disc 9a operating over the slotted opening 9. By varying the position of the disc 9a the inlet may be controlled.

Blades 10 are also provided on the hub 7. These receive the material and tend to throw it to the periphery of the shell where the material is entrained and discharged with the blower air and impelled by the blower air to the desired point of discharge. The fan tends to draw in air from the inlet 5 through the ejector effect of the discharged air and this suction effect assists in the feeding of the material. This suction effect may be increased or diminished by increasing or diminishing the capacity of the intake 9.

Should the abrasive material be undesirably destructive to the blades 10 this actuator comprising the blades 10 may be in the form of a separate piece 11, as shown in Fig. 5, so that it may readily be renewed or formed of different material from that of the body of the rotor. Rubber may be used for this purpose which resists abrasion more effectively than most metals. This matter of wear reduction may be also further accomplished by providing a stationary separating plate 12 as indicated in Fig. 7, this plate having positioning projections 13 on its periphery which engage the periphery of the case, and providing openings 14 at the periphery for the movement of material into position to be entrained by the air.

Where there is a clogging or obstruction pressure backs up in the discharge line and it is desirable to increase the pressure effort so as to overcome the obstruction or tendency to clog. This is done automatically in the present apparatus by providing a fitting 15 in the discharge line from which extends a passage 16 covered by diaphragm 17. The diaphragm 17 operates upon a lever 18. The lever is pivoted on a post 19 and is provided with gear segment 20. The gear segment operates a gear 21 which gear is fixed on a shaft 22 operating a rheostat 23 controlling the motor 2 so that the driving speed of the motor may be increased or decreased in response to differences of pressure in the discharge line.

What I claim as new is:

1. In a device of the character described, the combination of a case having separate inlets, one for air and one for material, and a discharge outlet; an air propeller receiving air from one inlet and discharging to the outlet, and entraining material from the other inlet, a motor driving the air propeller, means responsive to discharge pressure conditions controlling motor increasing the drive force of the motor with an increasing pressure at the discharge; and means conveying the material by means of the propelled air to the desired point of discharge.

2. In a device of the character described, the combination of a case having separate inlets, one for air and one for material, and a discharge outlet; an air propeller receiving air from one inlet and discharging to the outlet, and entraining material from the other inlet, a motor driving the air propeller, means responsive to discharge pressure conditions controlling the motor increasing the drive force of the motor with an increasing pressure at the discharge, the air actuating members of the propeller being separated from the material inlet.

3. In a device of the character described, the combination of a case having separate inlets, one for air and one for material, and a discharge outlet; an air propeller receiving air from one inlet and discharging to the outlet, and entraining material from the other inlet, a motor driving the air propeller, means responsive to discharge pressure conditions controlling the motor increasing the drive force of the motor with an increasing pressure at the discharge; and a stationary separating means between the material inlet and the air propeller.

4. In a device of the character described, the combination of a case having separate inlets, one for air and one for material, and a discharge outlet; an air propeller receiving air from one inlet and discharging to the outlet, and entraining material from the other inlet, a motor driving the air propeller, means responsive to discharge pressure conditions controlling the motor increasing the drive force of the motor with an increasing pressure at the discharge; and a rotating material actuator receiving the material from the material inlet and moving it toward the outlet.

5. In a device of the character described, the combination of a case having separate inlets, one for air and one for material, and a discharge outlet; an air propeller receiving air from one inlet and discharging to the outlet, and entraining material from the other inlet; a motor driving the air propeller, and devices responsive to discharge pressure conditions controlling the motor increasing the driving force of the motor with an increasing pressure at the discharge.

JOSEPH E. WHITFIELD.